United States Patent
Drogichen et al.

(10) Patent No.: US 7,353,418 B2
(45) Date of Patent: Apr. 1, 2008

(54) METHOD AND APPARATUS FOR UPDATING SERIAL DEVICES

(75) Inventors: Daniel P. Drogichen, Leucadia, CA (US); Eric E. Graf, Hillsboro, OR (US); James A. Gilbert, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1067 days.

(21) Appl. No.: 10/100,127

(22) Filed: Mar. 18, 2002

(65) Prior Publication Data

US 2003/0177287 A1 Sep. 18, 2003

(51) Int. Cl.
*H04L 7/02* (2006.01)
*H04L 7/04* (2006.01)
*H04L 7/10* (2006.01)
*H03K 5/14* (2006.01)

(52) U.S. Cl. .............. 713/401; 713/400; 713/500; 713/503; 327/161; 327/241

(58) Field of Classification Search ............... 327/161, 327/241
See application file for complete search history.

(56) References Cited

U.S. PATENT DOCUMENTS

| | | | |
|---|---|---|---|
| 3,930,239 A * | 12/1975 | Salters et al. ............... | 365/240 |
| 4,498,650 A * | 2/1985 | Smith et al. ............. | 246/122 R |
| 4,628,502 A * | 12/1986 | Boulard et al. ............. | 370/373 |
| 4,736,362 A * | 4/1988 | Clark et al. ................. | 370/363 |
| 5,864,486 A * | 1/1999 | Deming et al. ............... | 716/17 |
| 6,560,665 B1 * | 5/2003 | Resler et al. ............... | 710/305 |

OTHER PUBLICATIONS

Kalinsky, D., and Kalinsky, R. "Introduction to I2C".Embedded Systems Design [online], Jul. 31, 2001 [retrieved on Apr. 22, 2006]. Retrieved from the Internet:< URL: http://www.embedded.com/showArticle.jhtml?articleID=9900244.*
"IEEE Standard Test Access Port and Boundary-Scan Architecture", Institute of Electrical and Electronics Engineers, Inc., New York, NY, 2001.
"The Serial Peripheral Interface. Nautilus Chip—Project DEEPSEA", Ohio State University, Jan. 7, 2001.
Dunlup, Chris and Tom Fischaber, "Configuring Xilinx FPGAs Using an XC9500 CPLD and Parallel PROM" Jul. 27, 2000.

* cited by examiner

*Primary Examiner*—James K Trujillo
(74) *Attorney, Agent, or Firm*—Meyertons Hood Kivlin Kowert & Goetzel, P.C.; Stephen J. Curran

(57) ABSTRACT

The present invention provides a method and apparatus for updating serial devices. The apparatus includes a plurality of serial registers. The apparatus further includes a device adapted to provide a signal and a plurality of parallel registers, wherein each of the parallel registers is adapted to access at least one of the plurality of serial registers at substantially the same time in response to detecting the signal.

21 Claims, 7 Drawing Sheets

METHOD AND APPARATUS FOR UPDATING SERIAL DEVICES

BACKGROUND OF THE INVENTION

1. Field of the Invention

This invention relates generally to processor-based systems, and, more particularly, to updating serial devices in processor-based systems.

2. Description of the Related Art

Businesses may use processor-based systems to perform a variety of tasks. These tasks may include, but are not limited to, developing new software, maintaining databases of information related to operations and management, and hosting a web server that may facilitate communications with customers. To handle such a wide range of tasks, businesses may employ a processor-based system used in a network-centric environment.

One example of a processor-based system used in a network-centric environment is a mid-range server system. A single mid-range server system may have a plurality of system boards that may, for example, contain one or more processors and one or more cache memory elements that store copies of frequently used data in close proximity to the one or more processors to provide the one or more processors with faster access to the data. The one or more processors may also include one or more associated memory elements that may store larger blocks of data.

In some embodiments, the plurality of system boards in the mid-range server system may be configured as one or more domains, where a domain, for example, may act as a separate machine by running its own instance of an operating system to perform one or more of the configured tasks. For example, in one embodiment, one domain may be configured as a web server, another as a database server, and a third as a network server. The demands on the different domains may change over time and thus the configuration of the various domains may be reconfigured to make more efficient use of the available resources. For example, if the number of users attempting to access the web server declines, system boards may be removed from the web domain and added to another domain, such as the domain that supports the database server.

A single reconfiguration may affect a number of domains at substantially the same time, but traditional reconfiguration methods update domains by updating one or more configuration registers in a serial manner. Consequently, one or more domains may have to suspend performing tasks while the configuration registers of other domains are being updated. For example, if a reconfiguration removes a system board from a first domain and adds it to a second domain, both domains may stop performing tasks while the board is removed from the first domain and then added to the second domain. Updating domains in the traditional serial manner may therefore reduce the efficiency of the mid-range server system.

SUMMARY OF THE INVENTION

In one aspect of the instant invention, an apparatus is provided for updating serial devices. The apparatus includes a plurality of serial registers. The apparatus further includes a device adapted to provide a signal and a plurality of parallel registers, wherein each of the parallel registers is adapted to access at least one of the plurality of serial registers at substantially the same time in response to detecting the signal.

In one aspect of the present invention, a method is provided for updating serial registers. The method includes providing data to a plurality of serial registers in a serial manner. The method further includes detecting a signal and accessing the data in the plurality of serial registers in parallel at substantially the same time in response to detecting the signal.

BRIEF DESCRIPTION OF THE DRAWINGS

The invention may be understood by reference to the following description taken in conjunction with the accompanying drawings, in which like reference numerals identify like elements, and in which.

Figure 1:
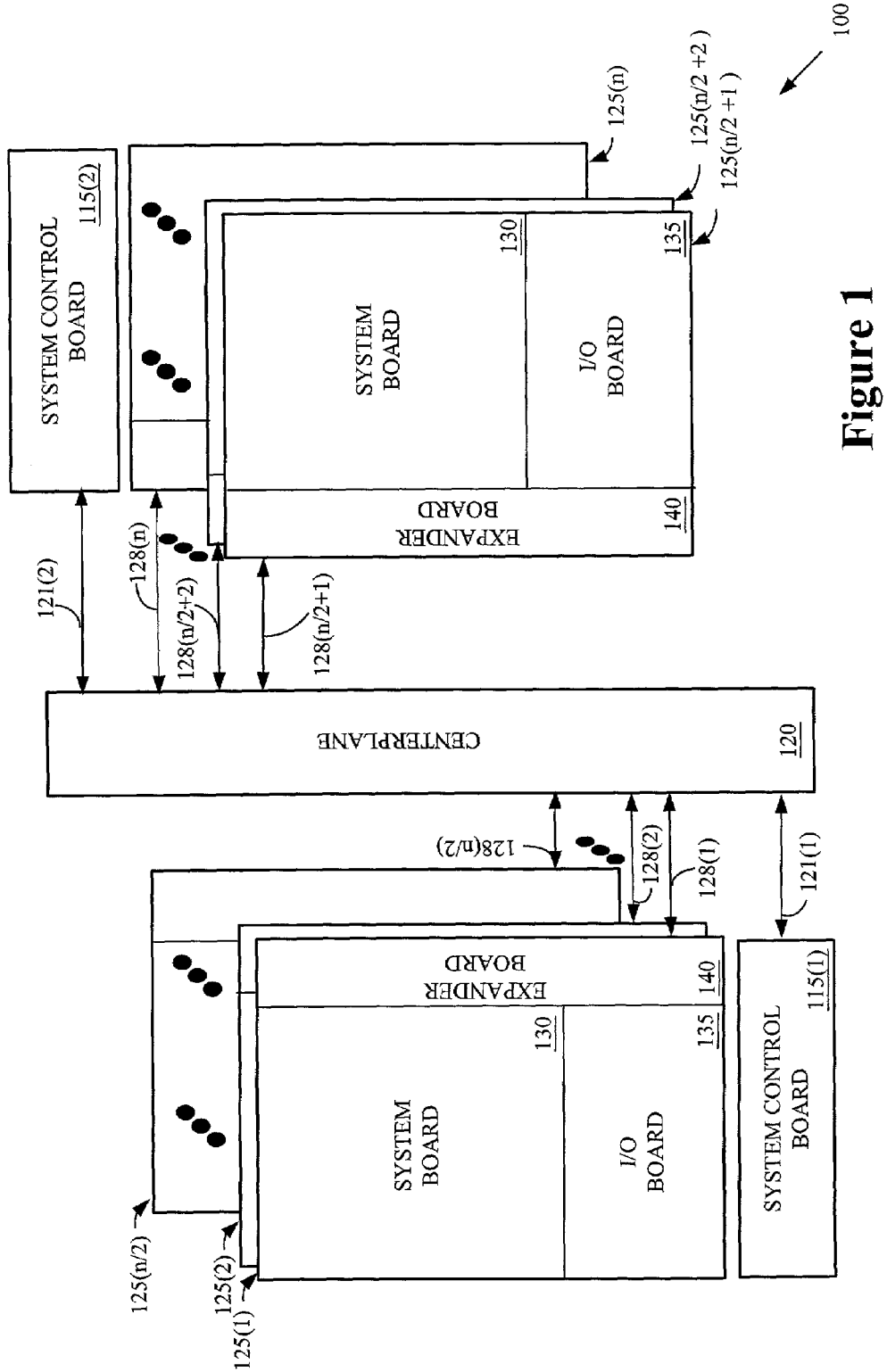
FIG. 1 shows a block diagram of a system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a block diagram of a system 100 in accordance with one embodiment of the present invention is illustrated. The system 100, in one embodiment, includes a plurality of system control boards 115(1-2) that are coupled to a centerplane 120. For illustrative purposes, lines 121(1-2) are utilized to show that the system control boards 115(1-2) are coupled to the centerplane 120, although it should be appreciated that, in other embodiments, the boards 115(1-2) may be coupled to the centerplane 120 in any of a variety of ways, including by edge connectors, cables, or other available interfaces.

In the illustrated embodiment, the system 100 includes two control boards 115(1-2), one for managing the overall operation of the system 100 and the other to provide redundancy and automatic failover in the event that the other board fails. Although not so limited, in the illustrated embodiment, the first system control board 115(1) serves as a "main" system control board, while the second system control board 115(2) serves as an alternate replaceable system control board. In one embodiment, during any given moment, generally one of the two system control boards 115(1-2) actively controls the overall operations of the system 100.

The system 100, in one embodiment, includes a plurality of system board sets 125(1-n) that are coupled to the centerplane 120, as indicated by lines 128(1-n). The system board sets 125(1-n) may be coupled to the centerplane 120 in one of several ways, including edge connectors or other available interfaces. The centerplane 120 may serve as a communications conduit for the plurality of system board sets 125(1-n), half of which may be connected on one side of the centerplane 120 and the other half on the opposite side of the centerplane 120. The centerplane 120, in one embodiment, may provide one or more communication pathways that allow the system board sets 125(1-n) and the system control boards 115(1-2) to communicate, if desired. Thus, the centerplane 120 may allow the two system control boards 115(1-2) to communicate with each other or with other system board sets 125(1-n), as well as allow the system board sets 125(1-n) to communicate with each other.

The system board sets 125(1-n), in one embodiment, comprise one or more boards, including a system board 130, an I/O board 135, and an expander board 140. The system board 130 may include processors and memories for executing applications, including portions of an operating system. The I/O board 135 may manage I/O cards, such as peripheral component interface cards and optical cards, which are installed in the system 100.

The expander board 140, in one embodiment, generally acts as a multiplexer (e.g., 2:1 multiplexer) to allow both the system and I/O boards 130, 135 to interface with the centerplane 120, which, in some instances, may have only one slot for interfacing with both boards 130, 135. In one embodiment, the system board 130 and the I/O 135 board may, separately or in combination with the expander board 140, be removed from the system 100 by decoupling one or more of the boards 130, 135 from their respective interface slots.

In one embodiment, the system 100 may be dynamically subdivided into a plurality of domains, where each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system).

The plurality of domains in the system 100 may be dynamically reconfigured while the system 100 is in operation without necessarily interrupting the operation of other domains. For example, the domain running the database server may be dynamically reconfigured without substantially affecting the function of the domain running the web server. Dynamic reconfiguration may, in one embodiment, comprise removing one or more system board sets 125(1-n), or other system assets such as the system board 130 or the I/O board 135, from a domain; adding one or more system board sets 125(1-n), or other system assets such as the system board 130 or the I/O board 135, to a domain; or a combination thereof.

To dynamically reconfigure the system 100, the system control board 115(1-2) may provide configuration data to a plurality of registers on a variety of application specific integrated circuits (ASICs) in the centerplane 120 and on the expander board 140. Providing the configuration data to the registers may include such actions as providing the configuration data to the centerplane 120, the expander board 140, and the like. In one embodiment, the registers may be shift registers connected in series, in which case accessing the registers may include serially shifting bits into and out of the registers.

In one embodiment, it may be desirable to provide different portions of the configuration data to registers on different ASICs. For example, the ASICs on the centerplane 120 may be used to determine the allowed communication links between system board sets 125(1-n), whereas the ASICs on the expander board 140 may be used to determine the addresses of other components within the domain. During a dynamic reconfiguration, it may thus be desirable to provide the ASICs on the centerplane 120 with a first portion of the configuration data that indicates the reconfigured set of allowed communication links and to provide the ASICs on the expander board 140 with a second portion of the configuration data that indicates the addresses of components in the reconfigured system 100. However, providing the first and second portions of the configuration data to more than one ASIC in a serial manner may cause one or more ASICs to suspend operation while awaiting the appropriate portion of the configuration data, thereby reducing the efficiency of the system 100. In one embodiment, one or more system board sets 125(1-n) may become substantially unavailable to perform tasks for several milliseconds during dynamic reconfiguration.

As will be described in more detail below, in accordance with one or more embodiments of the present invention, a method and apparatus may be provided to synchronize the provision of configuration data to components of the system 100. Configuration data may be provided serially to a plurality of registers over one or more serial buses. Once the configuration data has been provided to substantially all of the plurality of registers awaiting reconfiguration, the plurality of registers may then substantially simultaneously provide the configuration data to the one or more ASICs in response to a synchronization signal provided by the system control boards 115(1-2). As the ASICs may continue to operate while the configuration data is being provided to the registers, the overall efficiency of the system 100 may be increased.

Figure 2:
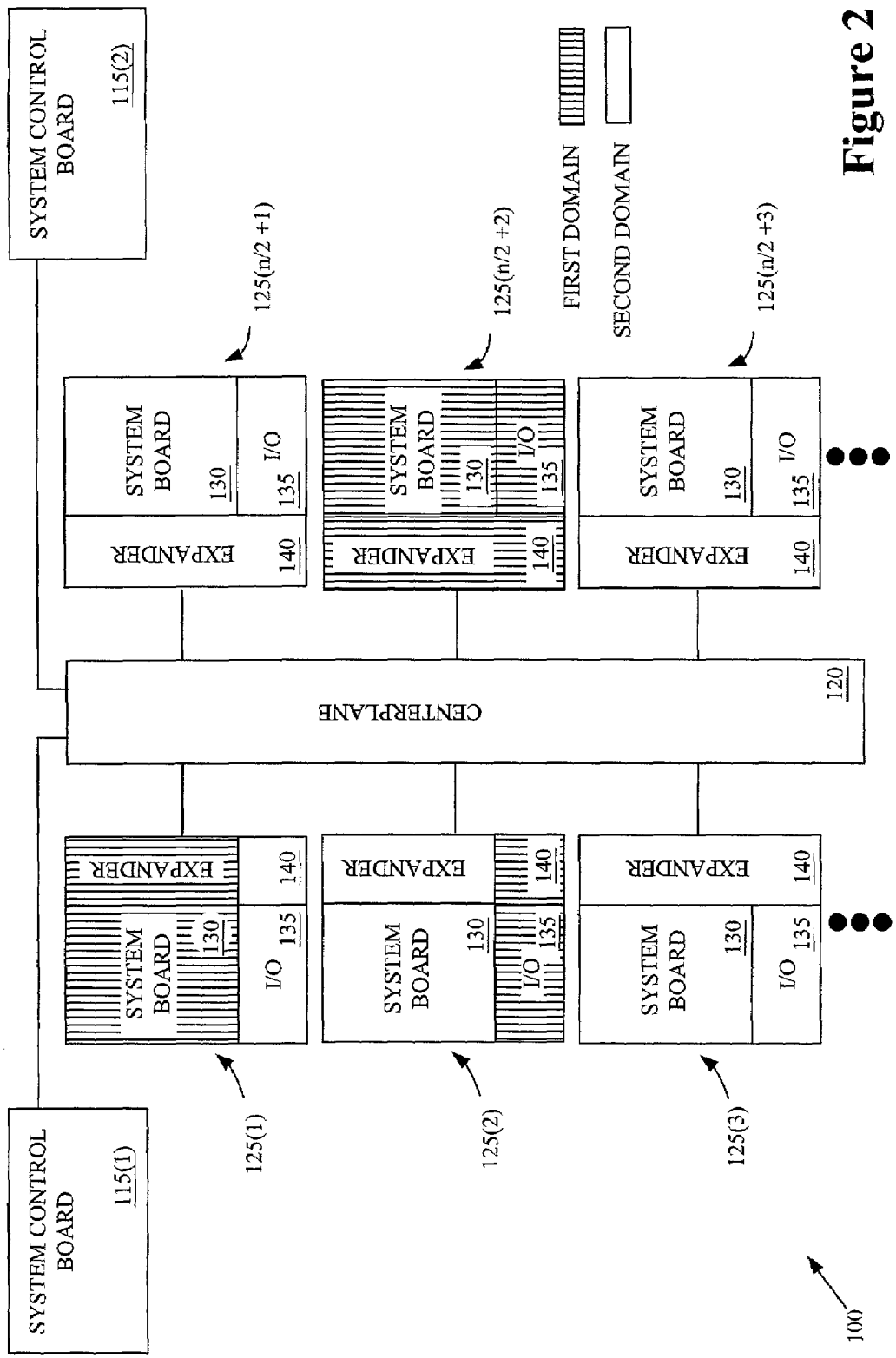
FIG. 2 illustrates a block diagram of an exemplary domain configuration that may be employed in the system of FIG. 1, in accordance with one embodiment of the present invention.

FIG. 2 illustrates an exemplary arrangement where at least two domains are defined in the system 100. The first domain, identified by vertical cross-sectional lines, includes the system board set 125(n/2+2), the system board 130 of the system board set 125(1), and the I/O board 135 of the system board set 125(2). The second domain in the illustrated embodiment includes the system board sets 125(3), 125(n/2+1), and 125(n/2+3), as well as the I/O board 135 of the system board set 125(1) and the system board 130 of the system board set 125(2).

As shown, a domain may be formed of an entire system board set 125(1-n), one or more boards (e.g., system board 130, I/O board 135) from selected system board sets 125(1-n), or a combination thereof. Although not necessary, it may be possible to define each system board set 125(1-n) as a separate domain. For example, if each system board set 125(1-n) were its own domain, the system 100 may conceivably have up to "n" (i.e., the number of system board sets) different domains. When two boards (e.g., system board 130, I/O board 135) from the same system board set 125(1-n) are in different domains, such a configuration is referred to as a "split expander." When used as a split expander, the expander board 140 of the system board sets 125(1-n), in one embodiment, keeps the transactions for the system board 130 in one domain separate from the transactions for the I/O board 135 in another domain. No physical proximity may be needed for boards in a domain.

Domains in the system 100 may be dynamically reconfigured. The process of dynamic reconfiguration may comprise removing one or more system board sets 125(1-n), one or more system boards 130, or one or more I/O boards 135 from the domain; adding one or more system board sets 125(1-n), one or more system boards 130, or one or more I/O boards 135 to the domain; or any combination thereof. As the term is used in the present context, "removing" should be understood to mean decoupling one or more boards 130, 135 or system board sets 125(1-n) from the domain, physically removing the one or more boards 130, 135 or system board sets 125(1-n) from the system 100, or any other desirable action that substantially makes the one or more boards 130, 135 or system board sets 125(1-n) unavailable to perform operations in the domain. Similarly, the term "adding" should be understood to mean coupling one or more boards 130, 135 or system board sets 125(1-n) to the domain, physically adding the one or more boards 130, 135 or system board sets 125(1-n) to the system 100, or any other desirable action that substantially makes the one or more boards 130, 135 or system board sets 125(1-n) available to perform operations in the domain.

During the reconfiguration process, the system control boards 115(1-2) may provide configuration data to the centerplane 120 and the expander boards 140. For example, the first domain and the second domain in FIG. 2 may be reconfigured such that the system board set 125(3) is removed from the second domain and added to the first domain. Configuration data provided to the expander board 140 may include addresses of components in the first domain that may allow the system board set 125(3) to establish communication with the other boards 130, 135 and/or system board sets 125(1-n) in the first domain. Configuration data provided to the centerplane 120 may indicate that intra-domain communication links between the system board set 125(3) and the other boards 130, 135 and/or system board sets 125(1-n) in the first domain are allowed. Similarly, configuration data provided to the centerplane 120 may indicate that intra-domain communication links between the system board set 125(3) and the remaining boards 130, 135 and/or system board sets 125(1-n) in the second domain are not allowed in the reconfigured system 100.

Figure 3:
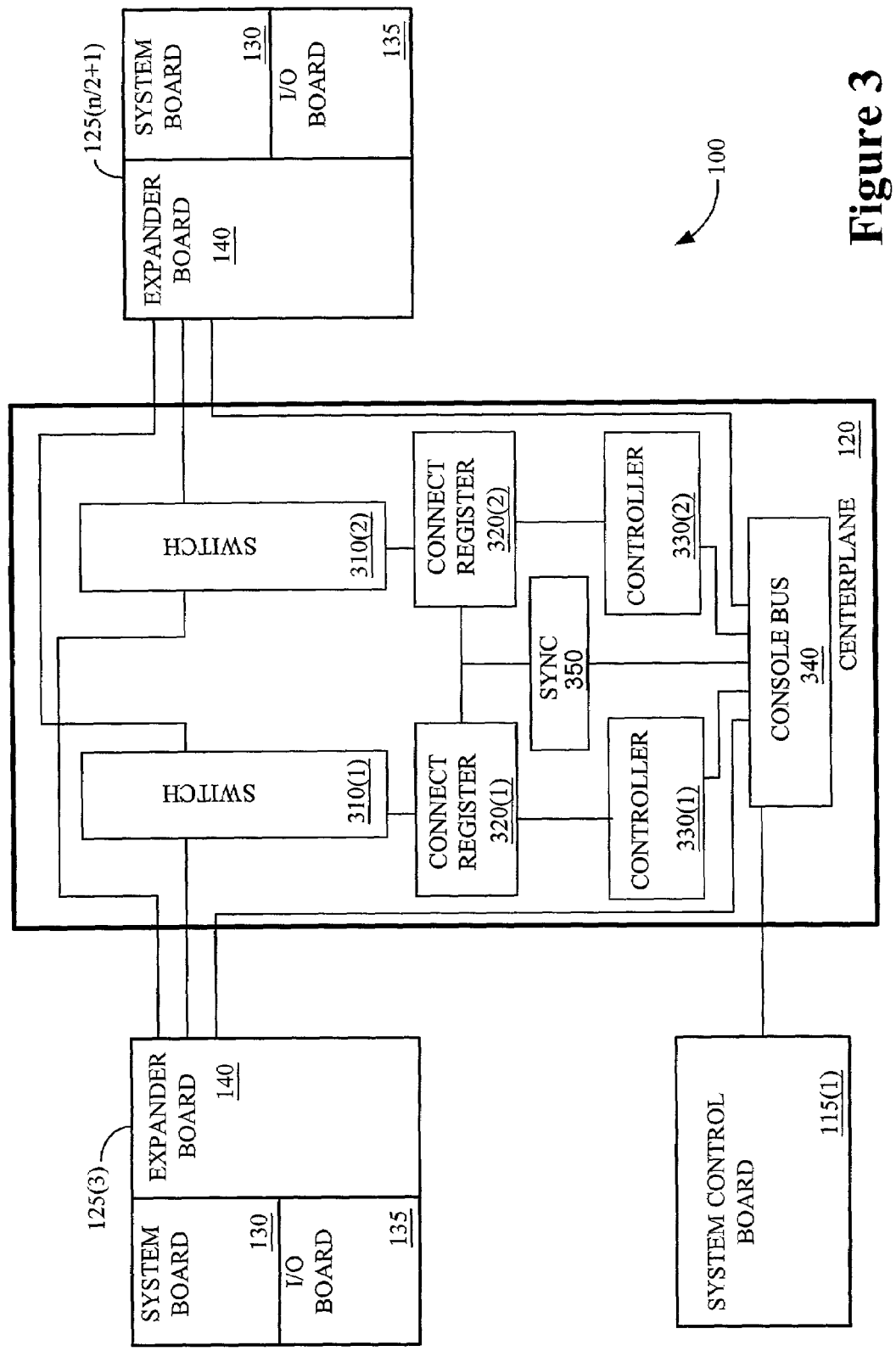
FIG. 3 shows a block diagram of a centerplane that may be used in the system of FIG. 1, in accordance with one embodiment of the present invention.

FIG. 3 shows a more detailed block diagram of the centerplane 120 in the system 100. For ease of illustration, only two system board sets 125(3), 125(n/2+1) from the first domain and the system control board 115(1) are shown in this figure. In one embodiment, the system board sets 125(3), 125(n/2+1) may be coupled by one or more switches 310(1-2) in the centerplane 120. The switches 310(1-2) may include separate pathways for transmitting respective data, address, and control signals provided from the expander board 140 of the system board sets 125(1-n). Thus, in one embodiment, the switches 310(1-2) may include three 18×18 crossbar switches that provide a separate data path, address path, and control signal path to allow intra- and inter-domain communications. Using separate paths for data, addresses, and control signals, in one embodiment, may reduce the interference among data traffic, address traffic, and control signal traffic. Pairs of system board sets (e.g. 125(3) and 125(n/2+1)) may use either switch 310(1-2) to transmit signals and, in the event that one of the switches 310(1-2) becomes substantially unable to form the desired communication link, the system board sets 125(3), 125(n/2+1) may use the remaining switch 310(1-2). In one embodiment, the switches 310(1-2) may provide a bandwidth of about 43 Gigabytes per second. In other embodiments, a higher or lower bandwidth may be achieved using the switch 310(1-2).

The one or more switches 310(1-2) may be coupled to one or more connect registers 320(1-2), which may store configuration data that may be used by the one or more switches 310(1-2) to determine the allowed intra-domain and inter-domain connections. In one embodiment, the connect registers 320(1-2) may include a plurality of logic elements (not shown) corresponding to the possible communication links between pairs of system board sets 125(1-n). For example, if the system 100 contains n=18 system board sets 125(1-n), the connect registers 320(1-2) may be an n×n=18×18=324-bit register. The logic elements may contain information that may be used to indicate whether the connection link is an intra-domain connection or an inter-domain connection. For example, in FIG. 3, the system board sets 125(3), 125(n/2+1) are both in the first domain, so the appropriate logic element in the connect registers 320(1-2) would be set to indicate that an intra-domain communication link between the system board sets 125(3), 125(n/2+1) is allowed. In alternative embodiments, the connect registers 320(1-2) may store additional information that may allow for a split expander 140, as described above.

Configuration data may be provided by the system control board 115(1) to one or more controllers 330(1-2) via a console bus 340. Although not so limited, in one embodiment, the console bus 340 may be an 8-bit parallel bus. In alternative embodiments, an Inter-IC (I2C) serial bus, a PCI bus, or any other standard or proprietary serial or parallel bus well known to those of ordinary skill in the art may be used to provide configuration data in the system 100.

As will be described in more detail below, the system control board 115(1) may provide instructions and configuration data that may be used to dynamically reconfigure the system 100. The instructions and portions of the configuration data may be serially shifted into the connect registers 320(1-2). According to one embodiment of the present invention, the portions of the configuration data in the connect registers 320(1-2) may be stored for a certain period of time and not used to dynamically reconfigure the connect registers 320(1-2) until a synchronization signal is detected. To provide the synchronization signal, the centerplane 120 may include at least one synchronizer 350 coupled to the console bus 340 and the connect registers 320(1-2). In one embodiment, the synchronizer 350 may be a repeater or an equivalent device well known to those of ordinary skill in the art. The synchronizer 350 may provide the synchronization signal in response to a signal broadcast by the system control board 115(1) through the console bus 340. As will be described in more detail below, the connect registers 320(1-

2) may use the synchronization signal from the synchronizer 350 to dynamically reconfigure at substantially the same time.

Figure 4:
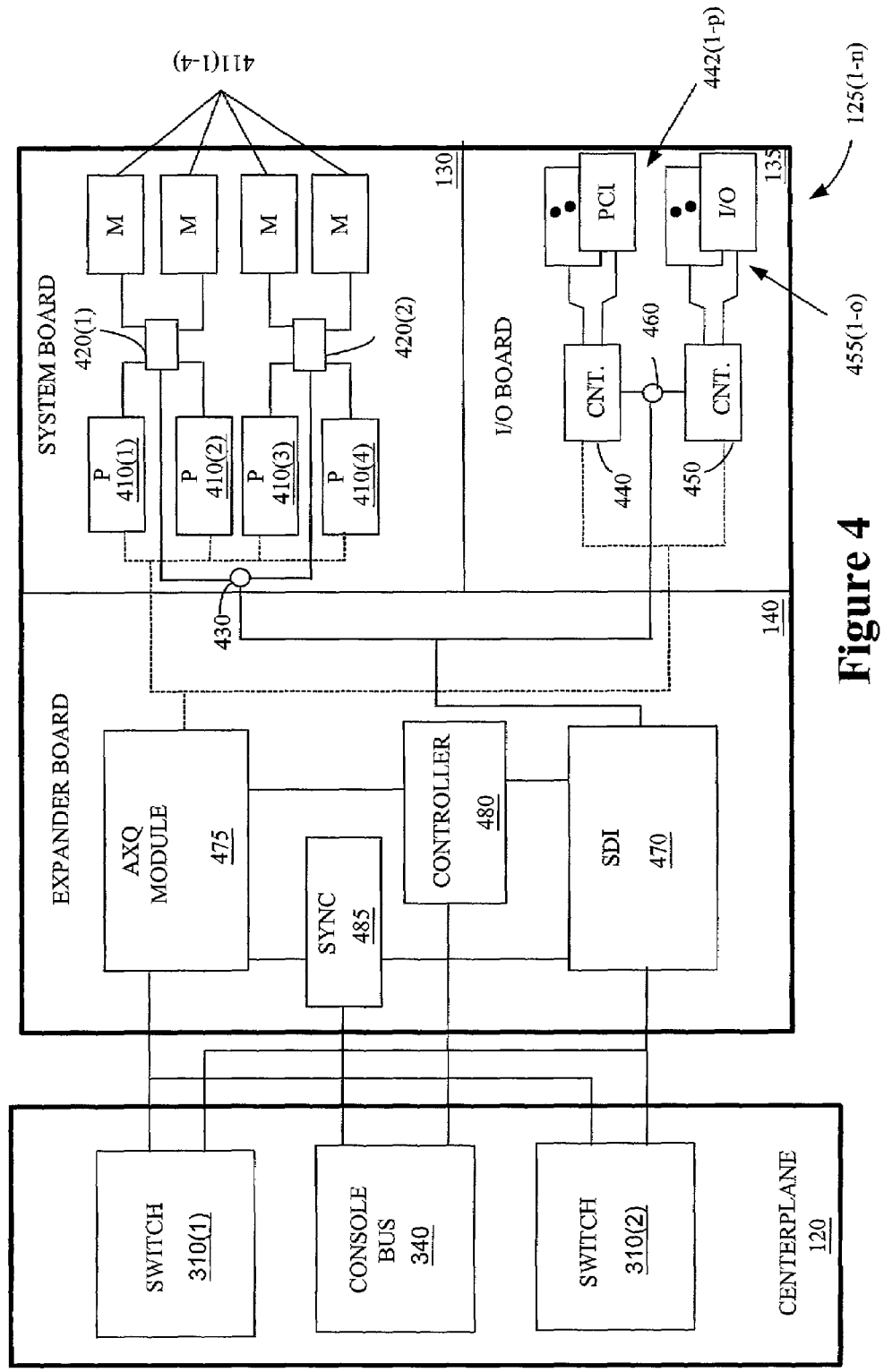
FIG. 4 depicts a block diagram of one system board set that may be employed in the system of FIG. 1, in accordance with one embodiment of the present invention.

FIG. 4 shows a block diagram of one system board set 125(1-n) that may be employed in the system 100. Although not so limited, the system board 130 of each system board set 125 (1-n) in the illustrated embodiment includes four processors 410(1-4), with each of the processors 410(1-4) having an associated memory 411(1-4). The processors 410(1-4), in one embodiment, may be able to access their own associated memories 411(1-4), as well as the memories associated with other processors in the same domain. In one embodiment, a different number of processors and memories may be employed in any desirable combination, depending on the implementation. In one embodiment, two five-port dual data switches 420(1-2) connect the processor/memory pairs (e.g., processors 410(1-2)/memories 411(1-2) and processors 410(3-4)/memories 411(3-4)) to a board data switch 430.

Although not so limited, the I/O board 135 of each system board set 125(1-n) in the illustrated embodiment includes a controller 440 for managing one or more of the PCI cards that may be installed in one or more PCI slots 442(1-p). In the illustrated embodiment, the I/O board 135 also includes a second controller 450 for managing one or more I/O cards that may be installed in one or more I/O slots 455(1-o). The I/O slots 455(1-o) may receive optics cards, network cards, and the like. The I/O board 135, in one embodiment, may communicate with the system control board 115(1-2) (see FIG. 1) over an internal network (not shown).

The two controllers 440, 450 of the I/O board 135, in one embodiment, are coupled to a data switch 460. A System Data Interface (SDI) 470 on the expander board 140 may receives an output signal from the data switch 460 of the I/O board 135 and from the switch 430 of the system board set 125(1-n). The SDI 470 may process data transactions to and from the switches 310(1-2) and the system and I/O boards 130 and 135. A separate address path (shown in dashed lines) is shown from the processors 410(1-4) and the controllers 440, 450 to an Address Expander Queue (AXQ) module 475. The AXQ module 475 may process address and response transactions to and from the switches 310(1-2) and the system and I/O boards 130 and 135.

The SDI 470 and the AXQ module 475 may be coupled to a controller 480. As will be described in more detail below, in one embodiment, the system control board 115(1) may provide instructions and configuration data to the controller 480 via the console bus 340. The instructions and portions of the configuration data may be serially delivered to the SDI 470 and the AXQ module 475. According to one embodiment of the present invention, the portions of the configuration data in the SDI 470 and the AXQ module 475 may be used to dynamically reconfigure the SDI 470 and the AXQ module 475 in response to a synchronization signal, which may be provided by at least one synchronizer 485. In one embodiment, the synchronizer 485 may be a repeater or an equivalent device well known to those of ordinary skill in the art. As will be described in more detail below, the synchronizer 485 may provide the synchronization signal in response to a signal broadcast by the system control board 115(1) through the console bus 340. The SDI 470 and the AXQ module 475 may be dynamically reconfigured in response to the synchronization signal at substantially the same time as the connect registers 320(1-2) and any other components of the system 100 that it may be desirable to dynamically reconfigure at substantially the same time.

Figure 5B:
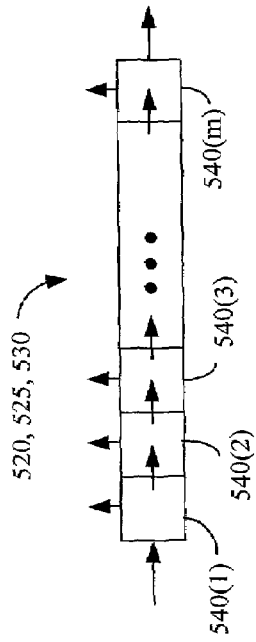
FIGS. 5A-C show a block diagram of an application specific integrated circuit (ASIC) that may be used in the centerplane of FIG. 3 or the system board set of FIG. 4, in accordance with one embodiment of the present invention.
Figure 5C:
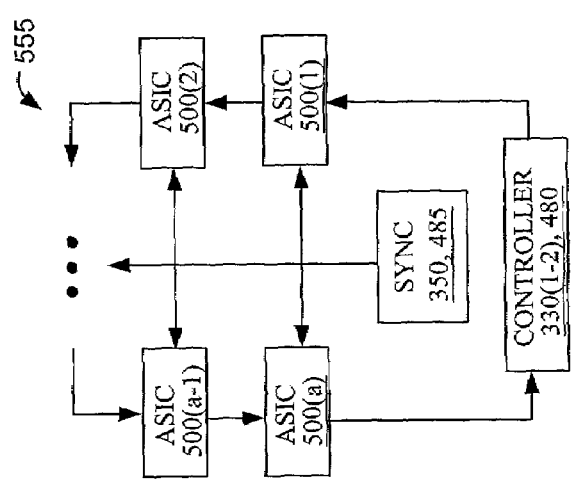
Figure 5A:
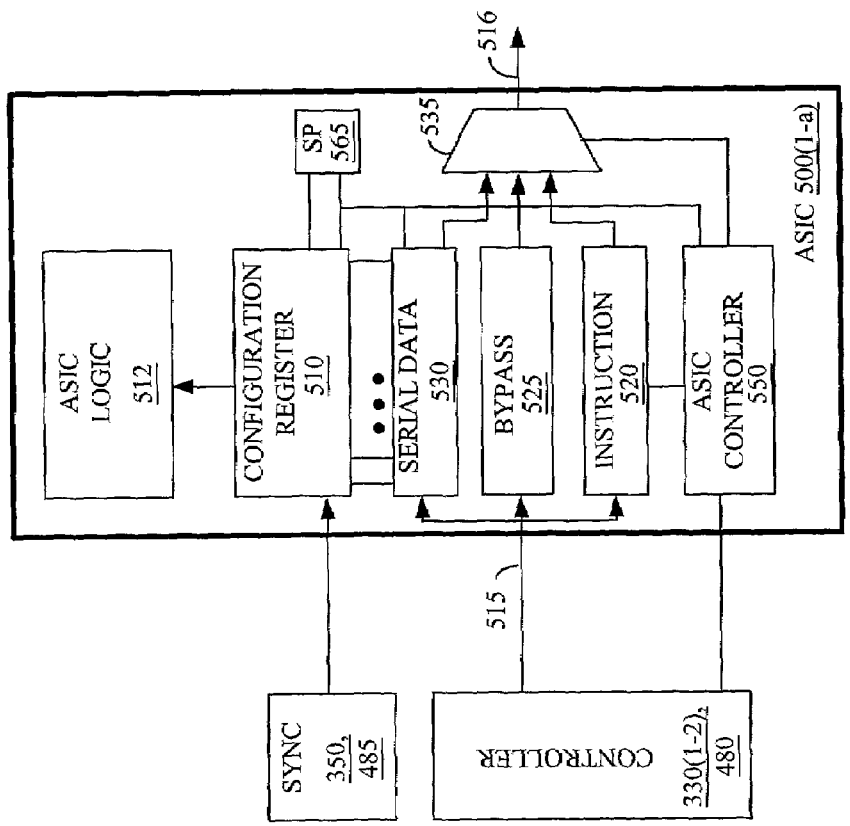

FIG. 5A shows a block diagram of an exemplary ASIC 500(1-a) that may be used to form the connect registers 320(1-2) (see FIG. 3), the SDI 470 and the AXQ module 475 (see FIG. 4), or any other desirable component of the system 100, in accordance with one embodiment of the present invention. In one embodiment, the ASIC 500(1-a) may include one or more configuration registers 510, which may store configuration data to be used by the ASIC logic 512. For example, the connect registers 320(1-2) may include the configuration register 510 storing data indicating the allowed intra-domain communication links. For another example, the AXQ module 475 may include the configuration register 510 storing addresses of elements of boards 130, 125, 140 such as processors, memory elements, and the like.

In one embodiment, a controller 330(1-2), 480 may be coupled in series to one or more ASICs 500(1-a) via a serial-in line 515 and a serial-out line 516. The serial-in line 515 may be coupled to a plurality of registers that may, in one embodiment, be deployed in parallel. Although not so limited, the registers may include one or more instruction registers 520, bypass registers 525, serial registers 530, and the like which may be coupled to a multiplexer 535. Although one instruction register 520, one bypass register 525, and one serial register 530 are shown in FIG. 5A, the present invention is not so limited. In alternative embodiments, any desirable number of registers may be used in the ASICs 500(1-a) without departing from the scope of the present invention.

An ASIC controller 550 may determine which register 520, 525, 530 forms the serial path through the one or more ASICs 500(1-a) by controlling the multiplexer 535. For example, the ASIC controller 550 may assert a signal that instructs the multiplexer 535 to select the channel corresponding to the bypass register 525. In that case, data may be shifted into the ASIC 500(1-a) via the serial-in line 515, through the bypass register 525, and out of the ASIC 500(1-a) via the serial-out line 516. In one embodiment, the serial-in line 515 and serial-out line 516, as well as the registers 520, 525, 530 and the ASIC controller 550, may conform to the Joint Test Action Group (JTAG) Standard, also known as the Institute of Electrical and Electronics Engineers (IEEE) Standard 1149.1, entitled "Standard test access port and boundary scan architecture." The JTAG Standard provides a serial bus standard that may be used to implement a general purpose hardware configuration, initialization, and status bus.

FIG. 5B shows one exemplary embodiment of a register that may be used to form the instruction register 520, the bypass register 525, the serial register 530, and any other registers that it may be desirable to include in the one or more ASICs 500(1-a). The register 520, 525, 530 may include a plurality of register cells 540(1-m) that may store data. For example, each register cell 540(1-m) may store one bit. Data may be shifted serially into the register 520, 525, 530 in the direction indicated by the horizontal arrows. For example, to load a string of logic-1 bits into the instruction register 520, a first bit set to logic-1 may be shifted into the register cell 540(1). The first bit may then be shifted to the register cell 540(2) and a second bit set to logic-1 may be shifted into the register cell 540(1). The process may be repeated until the first bit has been shifted to the register cell 540(m) and all the register cells contain a bit set to logic-1. The number of shifts required to shift data into the register cell 540(1) and then to shift the data from the register cell 540(1) to the register cell 540(m) will be referred to hereinafter as a "register length." In one embodiment, the register length may be any number greater than or equal to one. For example, the register length of the bypass register 525 may be one. For another example, the register length of the instruction register 520 may be eight.

Data may also be written to, and read from, the registers 520, 525, 530 in parallel. For example, the data stored in the register cells 540(1-m) may be transmitted to a device (not shown) at substantially the same time, as indicated by the vertical arrows in FIG. 5B.

FIG. 5C shows a ring 555 including the one or more ASICs 500(1-a) that may, in one embodiment, be coupled in series to the controller 330(1-2), 480. The registers 520, 525, 530 in the ASICs 500(1-a) of the ring 555 may be accessed sequentially and so the controller 330(1-2), 480 may serially shift data into the registers 520, 525, 530. For example, in one embodiment, the controller 330(1-2), 480 may instruct an ASIC controller 550 in each of the ASICs 500(1-a) to place their respective instruction registers 520 in the serial path. The controller 330(1-2), 480 may then shift a preselected series of bits, hereinafter referred to as an "instruction," into the register cells 540(1-m) of each of the instruction registers 520. For example, the controller 330(1-2), 480 may shift a string of logic-1 bits, e.g 111 . . . 1, into the register cells 540(1-m) of the instruction registers 520. The instruction may, in one embodiment, be used by the ASIC controller 550 to control the operation of the registers 525, 530.

The ASIC controller 550 may also place the serial data registers 530 in the serial path of the one or more ASICs 500(1-a) so that configuration data may be provided to the serial data register 530. In one embodiment, the configuration register 510 may be coupled in parallel to the serial register 530. However, allowing the configuration register 510 continuous access to the serial data register 530 may not be desirable. For example, if the configuration register 510 accesses the serial data register 530 while the controllers 330(1-2), 480 are shifting data into the serial data register 530, the configuration register 510 may detect a mixture of updated data and previous data in the cells 540(1-m) of the serial data register 530. Thus, in one embodiment, the ASIC controller 550 may stop parallel data transfer between the serial data register 530 and the configuration register 510 until the controllers 330(1-2), 480 have substantially completed shifting data into serial data register 530. When the controllers 330(1-2), 480 have substantially completed shifting data into serial data register 530, the ASIC controller 550 may instruct the configuration register 510 to access the serial data register 530.

In accordance with one embodiment of the present invention, configuration data may be provided to the configuration registers 510 in one or more of the plurality of ASICs 500(1-a) in the system 100 at substantially the same time in response to a synchronization signal. To provide the configuration data at substantially the same time, the controllers 330(1-2), 480 may instruct the ASIC controllers 550 in one or more of the plurality of ASICs 500(1-a) to substantially stop the parallel transfer of data from the serial data register 530 to the configuration register 510 and set a logic element (SP) 565 to indicate that the serial data register 530 may be ready to receive the synchronization signal from the synchronizer 350, 485. The ASIC controller 550 may also place the bypass register 525 in the serial path. Upon receiving the synchronization signal from the synchronizer 350, 485, the configuration registers 510 in the one or more of the plurality of ASICs 500(1-a) may access the configuration data stored in the serial data registers 530 substantially simultaneously.

Figure 6A:
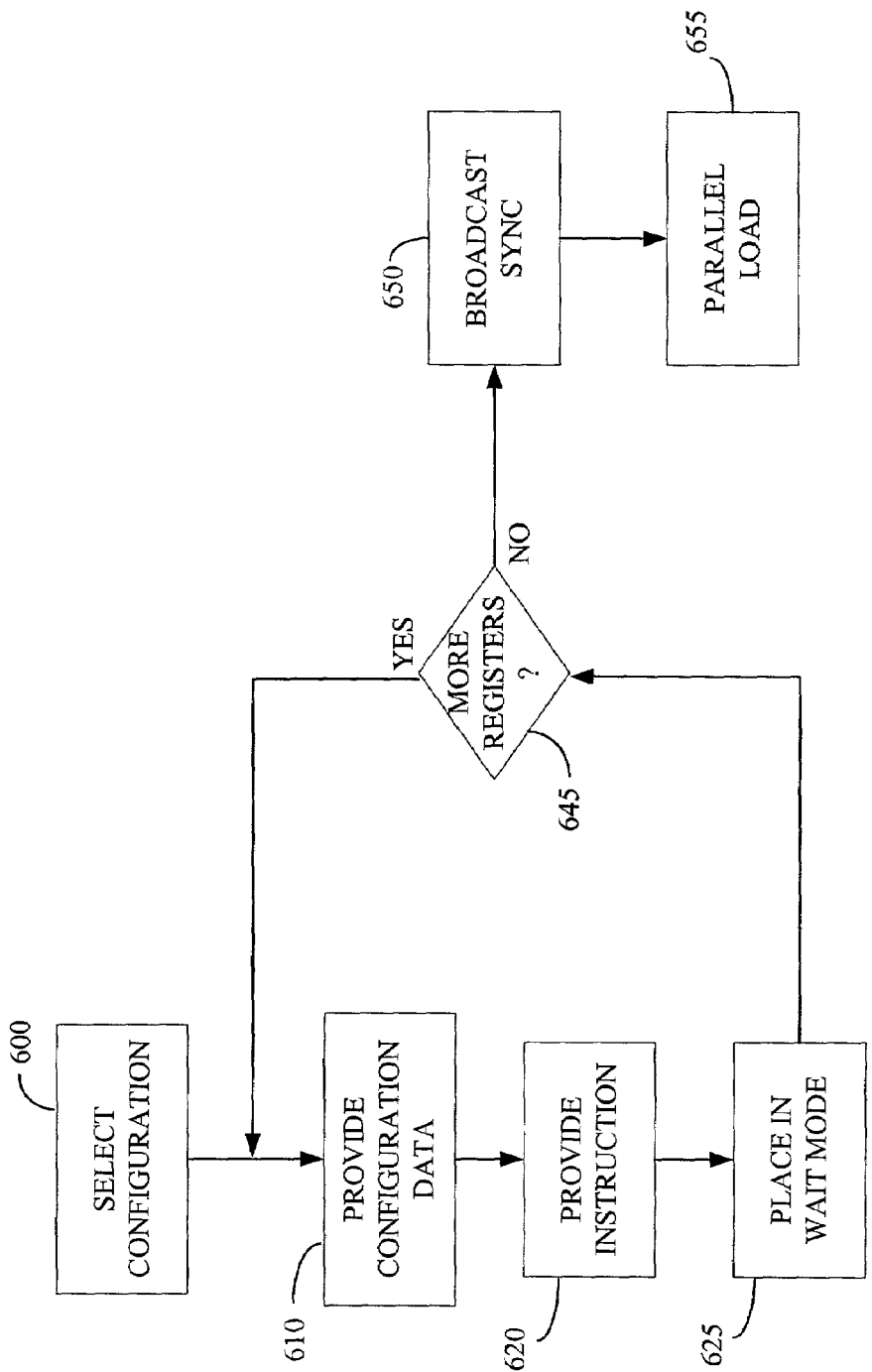
FIGS. 6A-C show a flow chart depicting a method of providing data to a plurality of ASICs shown in FIG. 5, in accordance with one embodiment of the present invention.

FIG. 6A shows a flow diagram illustrating a method of providing configuration data to one or more of the plurality of ASICs 500(1-a) at substantially the same time. Although the following discussion describes a process of dynamic reconfiguration, it should be appreciated that, in alternative embodiments, this method may be equally useful for synchronizing other tasks in the system 100. For example, two data arbiter ASICs that steer data through the centerplane 120, such as that in Sun's Sun Fire high-end server system, may use one or more free-running timers to synchronize various tasks. In accordance with one embodiment of the present invention, the free-running timers may be started substantially simultaneously.

To dynamically reconfigure the system 100, a user, such as a system administrator, or an automated process in the system 100 may select (at 600) a configuration of the system 100. Selecting (at 600) a configuration may, in one embodiment, comprise such actions as determining which components of the system it may be desirable to remove from a domain, which components it may be desirable to add to a domain, or a combination thereof. Selecting (at 600) a configuration may also include tasks such as determining the appropriate configuration data, determining which of the plurality of ASICs 500(1-a) in the system 100 may use the configuration data, and the like.

The system control boards 115(1-2) may provide (at 610) the configuration data to the controllers 330(1-2), 480 via the console bus 340. In one embodiment, portions of the configuration data may be provided (at 610) sequentially to one or more selected ASICs 500(1-a) in a serial fashion and the controllers 330(1-2), 480 may shift the portions of the configuration data into the serial data registers 530 of the selected ASICs 500(1-a), as described above. The system control boards 115(1-2) may also instruct (at 620) the ASIC controller 550 to place (at 625) the ASIC 500(1-a) in a wait mode, as described below.

Figure 6C:
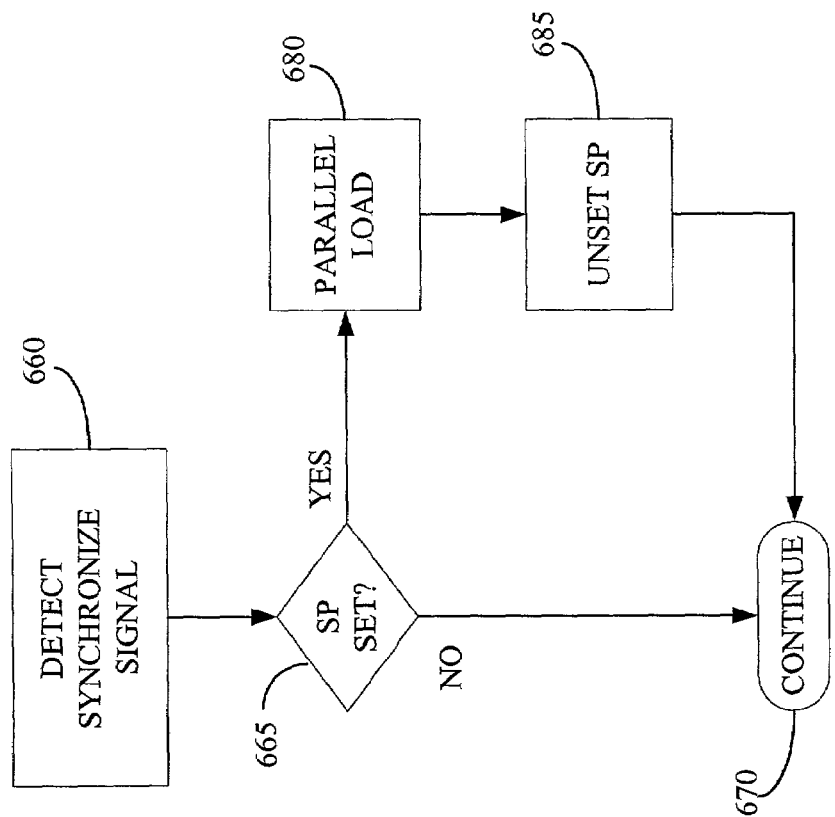
Figure 6B:
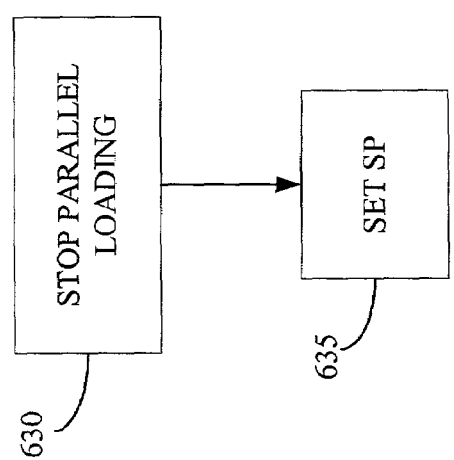

Referring now to FIG. 6B, a method of placing (at 625) one or more of the plurality of ASICs 500(1-a) in the wait mode is shown. In accordance with one embodiment of the present invention, the ASIC controller 550 may stop (at 630) the parallel loading of data from the serial data register 530 to the configuration register 510. Although updated configuration data may be in the serial data register 530, the ASIC logic 512 in the ASICs 500(1-a) may continue to operate using the configuration data currently contained in the configuration registers 510 because the parallel loading of data has been substantially stopped. The ASIC controller 550 may also set (at 635) the logic element 565 to indicate that synchronization may be pending. Although the steps of stopping (at 630) the parallel loading and setting (at 635) the logic element have been described as happening sequentially, it should be appreciated that these steps may occur in any order, or substantially simultaneously, without departing from the scope of the present invention.

Referring back to FIG. 6A, the system control board 115(1-2) may determine (at 645) whether it may be desirable to provide (at 610) portions of the configuration data to one or more additional registers which may be on one or more additional ASICs 500(1-a). If so, the system control boards 115(1-2) may provide (at 610) the configuration data to the controllers 330(1-2), 480 via the console bus 340, as described above. If not, and the configuration data has been provided (at 610) to substantially all the desired ASICs 500(1-a), the system control board 115(1-2) may broadcast (at 650) a synchronization signal. The synchronizers 350, 485 in the one or more ASICs 500(1-a) in the system 100 may use the synchronization signal to parallel load (at 655) the configuration data from the serial data registers 530 to the configuration registers 510 of the plurality of ASICs 500(1-a) at substantially the same time.

FIG. 6C shows a flow chart illustrating a method of updating the configuration register 510 in one of the plurality of ASICs 500(1-a) in response to detecting (at 660) the synchronization signal. The synchronizer 350, 485 may detect (at 660) the synchronization signal. If it is determined (at 665) that the logic element 565 has not been set, indicating that the one or more ASICs 500(1-a) may not be reconfigured and that parallel loading has not been stopped (at 635), the one or more ASICs 500(1-a) may continue (at 670) operation.

In accordance with one embodiment of the present invention, if it is determined (at 665) that the logic element 565 has been set, indicating that the serial data register 530 contains portions of the configuration data and that parallel loading has been stopped (at 635), the configuration register 510 may parallel load (at 680) the portions of the configuration data from the serial data register 530. The logic element 565 may then be unset (at 685), and the one or more ASICs 500(1-a) may continue (at 670) operation. Although the steps of parallel loading (at 680) and unsetting (at 685) the logic element have been described as happening sequentially, it should be appreciated that these steps may occur in any order, or substantially simultaneously, without departing from the scope of the present invention. By parallel loading (at 680) of portions of the configuration data in response to detecting (at 660) the synchronization signal, the overall efficiency of the system 100 may be increased.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
   a plurality of serial shift registers;
   a controller configured to provide data serially to the plurality of serial shift registers;
   wherein the plurality of serial shift registers are arranged in series in a ring such that the data provided by the controller is shifted sequentially from one serial shift register to another until at least a portion of the serial shift registers have been loaded with the data;
   a device adapted to provide a signal; and
   a plurality of parallel registers, wherein each of the parallel registers is adapted to access the data within a respective one of the plurality of shift serial registers at substantially the same time in response to detecting the signal.

2. The apparatus of claim 1, further comprising an instruction register adapted to receive instructions from the controller.

3. The apparatus of claim 2, wherein the controller is adapted to deliver an instruction to the instruction register to prevent the parallel registers from accessing the respective serial shift registers.

4. The apparatus of claim 3, further comprising a logic element to indicate that the controller has prevented the parallel registers from accessing the respective serial shift registers.

5. The apparatus of claim 4, wherein the controller is adapted to allow the parallel registers to access the respective serial shift registers at substantially the same time in response to detecting the signal.

6. The apparatus of claim 1, wherein the plurality of parallel registers are associated with a plurality of application specific integrated circuits (ASICs) in a system.

7. The apparatus of claim 6, wherein the parallel registers use the provided data to configure the associated ASICs.

8. The apparatus of claim 1, wherein the device is a system board controller.

9. A method, comprising:
   arranging a plurality of serial shift registers in series, in a ring;
   providing data serially to plurality of serial shift registers;
   shifting the data sequentially from one serial shift register to another until at least a portion of the serial shift registers have been loaded with the data;
   detecting a signal; and
   accessing the data in the at least a portion of the plurality of serial shift registers in parallel at substantially the same time in response to detecting the signal.

10. The method of claim 9, wherein providing the data comprises providing the data via a serial bus.

11. The method of claim 10, wherein providing the data comprises shifting the data serially though a plurality of cells in the serial shift registers.

12. The method of claim 11, wherein providing the data comprises stopping access to the serial shift registers once the data has been substantially serially shifted to the serial shift registers.

13. The method of claim 12, wherein stopping access to the serial shift registers comprises setting a logic element.

14. The method of claim 13, wherein accessing the data in response to detecting the signal comprises detecting the setting of the logic element and allowing access to the serial shift registers if the logic element has been set.

15. The method of claim 14, wherein accessing the data in the plurality of serial registers comprises transmitting the data in the plurality of serial registers to the plurality of parallel registers in a parallel manner at substantially the same time.

16. A system, comprising:
    a plurality of serial shift registers;
    a first controller adapted to provide data serially to the plurality of serial shift registers via a bus;
    wherein the plurality of serial shift registers are arranged in series in a ring such that the data provided by the controller is shifted sequentially from one serial shift register to another until at least a portion of the serial shift registers have been loaded with the data; and
    a plurality of parallel registers, each coupled to a respective one of the serial shift registers, wherein the parallel registers are adapted to access the data in the respective ones of serial shift registers at substantially the same time in response to receiving a signal.

17. The system of claim 16, further comprising a plurality of system assets, wherein a second controller uses the data in at least one of the parallel registers to configure a portion of the system assets into at least one domain in the system.

18. The system of claim 17, wherein the system is adapted to access the data in at least one of the parallel registers to determine the allowed intra- and inter-domain communication pathways for the at least one domain.

19. The system of claim 16, wherein the bus is a serial bus.

20. The system of claim 16, wherein the data comprises at least one of an instruction and a configuration.

21. The system of claim 16, wherein the controller is a system board controller.

* * * * *